July 20, 1965   L. J. MALO   3,195,190
PORCH ATTACHMENT FOR TRAILER
Filed Nov. 2, 1961
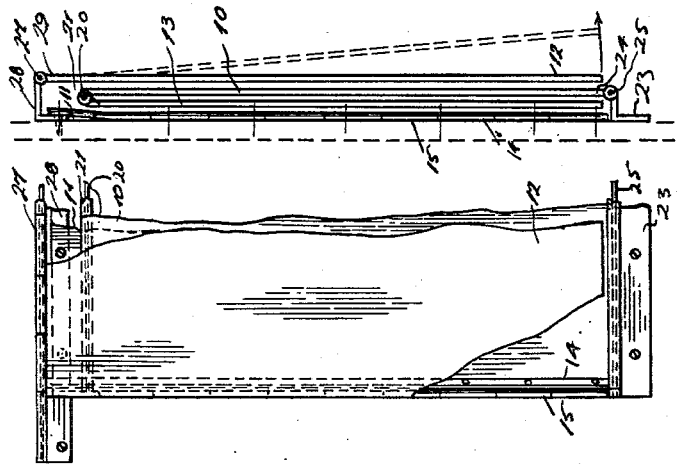
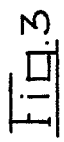
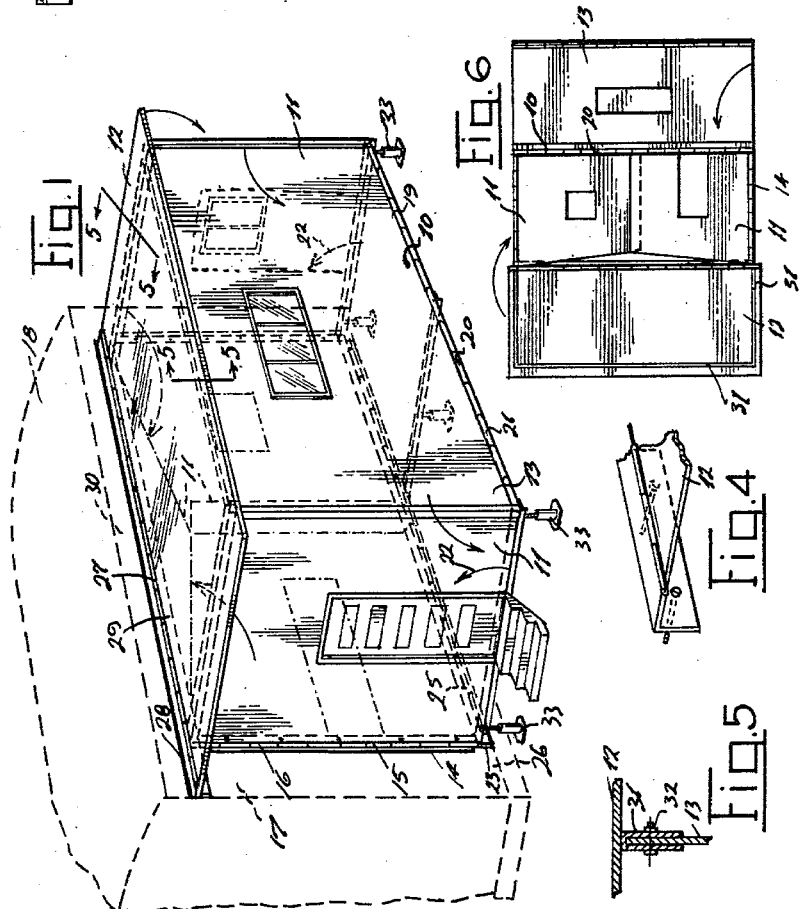
INVENTOR
LUCIEN J. MALO 3,195,190
PORCH ATTACHMENT FOR TRAILER
Lucien J. Malo, 2004 37th St. SE., Calgary,
Alberta, Canada
Filed Nov. 2, 1961, Ser. No. 149,659
1 Claim. (Cl. 20—2)

My invention relates to new and useful improvements in collapsible porches particularly adapted to be secured to the side wall of a conventional trailer.

Porch extensions are well known for trailers but normally these are detachable and have to be assembled to the side or end walls of the trailer after the trailer is in position.

Not only is storage a problem with these constructions, but considerable time is involved in assembly and disassembly thereof.

By providing a porch having end walls, a floor, a roof and a front wall hingedly connected together, the entire assembly can be folded upon the side wall of the trailer and readily unfolded for assembly when desired.

The principal object and essence of my invention is therefore to provide a device of the character herewithin described which can rapidly and easily be assembled or disassembled as desired.

Another object of my invention is to provide a device of the character herewithin described which can be stored in the minimum of space against the side wall of a trailer when in the disassembled position.

A yet further object of my invention is to provide a porch for a trailer of the character herewithin described which does not effect the operation of the trailer and can be left in the folded position if not required for use.

A still further object of my invention is to provide a device of the character herewithin described which is simple in construction, economical in manufacture and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a perspective view of my porch shown in the unfolded or assembled position against the side wall of a trailer.

FIGURE 2 is an end view of my porch shown in the folded position against the side wall of a trailer.

FIGURE 3 is a fragmentary elevation at right angles to FIGURE 2.

FIGURE 4 is a perspective detailed view showing the hinging attachment of the roof to the trailer.

FIGURE 5 is a fragmentary section along the lines 5—5 of FIGURE 1.

FIGURE 6 is a plan view, in reduced scale, showing the folding layout.

In the drawings like characters of reference indicate corresponding parts in the different figures.

Proceeding therefore to describe my invention in detail, reference should be made to the accompanying drawings in which reference character 10 illustrates the floor panel of the porch, 11 the end wall panels thereof, 12 the roof panel thereof and 13 the front panel thereof.

In detail, vertical angle irons 14 are secured to the side wall of the trailer adjacent each end thereof and hinges 15 attach the side walls 11 to the angle irons 14 by means of the inner edges 16 of the side walls, so that these side walls can be folded inwardly as shown in phantom in FIGURE 1 to lie flat against the side wall 17 of the trailer 18. The front panel 13 is hingedly secured by the lower edge 19 thereof to the outer edge 20 of the floor panel by means of hinge 21 so that the front wall can fold downwardly in the direction of arrow 22 to lie flat upon the floor panel 10.

The floor panel 10 is hingedly secured to an angle iron 23 by the inner edge 24 thereof via hinge 25, said angle iron 23 being secured adjacent the lower edge 26 of the trailer side wall 17. This means that when the front panel 13 is folded downwardly upon the floor panel 10, both of these panels may then be folded upwardly against the side wall 17 of the trailer and covering the inwardly folded end walls 11 of the porch as clearly shown in FIGURE 2.

Finally the roof panel 12 is hingedly secured by means of hinge 27 to an angle iron 28 by means of the rear edge 29 of the roof panel, said angle iron being secured to the side wall 17 of the trailer and adjacent the upper edge 30 thereof. It will therefore be appreciated that the roof panel can be hinged downwardly thus enclosing the side walls, and the floor and front panels 10 and 13 as clearly shown in FIGURE 2. In this connection the dimensions of the angle irons 23 and 28 permit the panels to be folded in a neat flush manner as clearly shown. It will be noted that the angle bars 14, 23 and 28, which have the respective panels 11, 10 and 12 hinged thereto, constitute a perimetric frame which, as such, may be bolted to the side wall 17 of the trailer to detachably fasten the entire porch to the trailer and that, similarly, the entire porch may be readily separated from the trailer by simply unbolting from the trailer wall the perimetric frame constituted by the angle bars 14, 23 and 28.

Channel irons 31 are secured around the underside of the roof panel 12 adjacent the edges thereof and these channels are preferably lowered over the upper edges of the side walls and front wall when the porch is extended and temporarily secured to the roof by means of bolts 32 as clearly shown in detail in FIGURE 5.

FIGURE 6 shows the folding layout in which the roof is elevated upwardly so that the side panels 11 can be folded flush against the side wall of the trailer, the front panel is folded downwardly upon the floor panel 10 whereupon both of these panels are then folded upwardly against the folded side panels and finally the roof panel is lowered downwardly to enclose the panels. In order to assemble the porch, of course, the reverse procedure is undertaken.

Screw threaded jacks 33 are provided at convenient points around the floor panel 10 in order to support same when in the extended position, said jacks either being detachable and stored within the trailer, or alternatively, foldably secured to the base of the floor so that they can be folded upwardly when the device is retracted.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

The combination of a conventional house trailer having a side wall, and a readily applicable and removable porch attachment for said trailer, said porch attachment comprising in combination, a vertically disposed perimetric frame detachably bolted to said side wall, said frame including vertically spaced upper and lower frame members and a pair of transversely spaced side frame members, a pair of porch side panels having inner edges hingedly connected to said side frame members whereby the side panels may be folded to a flat storage position against said frame, a porch floor panel having an inner edge hingedly connected to a portion of said lower frame member projecting outwardly beyond said side frame members and said side panels when the latter are folded, said floor panel also having an outer edge, a porch outer panel hingedly connected at its lower edge to the outer edge of said floor panel, and a porch roof panel having an inner edge hingedly connected to a portion of said upper frame member projecting outwardly beyond said side and lower frame members and beyond said side panels, said floor panel and said outer panel when said panels are folded in a storage position, whereby said roof panel may be folded down over the folded side, floor and outer panels, said roof panel also having side edge portions resting on upper edges of said side panels and an outer edge portion resting on the upper edge of said outer panel when the side and outer panels are unfolded, said side wall of said trailer coacting with the unfolded porch side panels, floor panel, outer panel and roof panel to define a porch enclosure, and channels with downwardly opening grooves provided at the side edge portions and the outer edge portion of said roof panel, said channels receiving in the grooves thereof the upper edge portions of said side panels and outer panel respectively.

References Cited by the Examiner

UNITED STATES PATENTS

| | | | |
|---|---|---|---|
| 995,712 | 6/11 | Pickering | 20—2 |
| 1,137,473 | 4/15 | Ford | 20—1 |
| 1,417,736 | 5/22 | Heygate | 20—2 |
| 2,167,557 | 7/39 | Stout. | |
| 2,820,991 | 1/58 | Poole | 20—2 |
| 2,832,637 | 4/58 | Decosse. | |
| 2,841,832 | 7/58 | Couse et al. | 20—2 |
| 2,860,384 | 11/58 | Wait | 20—2 |
| 2,907,077 | 10/59 | Pugsley | 20—2 |
| 2,965,413 | 12/60 | Barnes. | |

FOREIGN PATENTS

| | | |
|---|---|---|
| 302,346 | 1954 | Switzerland. |
| 376,998 | 1932 | Great Britain. |
| 529,539 | 1957 | Italy. |

OTHER REFERENCES

Sears Roebuck and Company, Fall and Winter Issue, 1960 Catalog No. 221, Philadelphia, Pa., pages 1110, 1111.

JACOB L. NACKENOFF, *Primary Examiner*.

WILLIAM J. MUSHAKE, *Examiner*.